(12) United States Patent
Plondke et al.

(10) Patent No.: US 9,207,943 B2
(45) Date of Patent: Dec. 8, 2015

(54) REAL TIME MULTITHREADED SCHEDULER AND SCHEDULING METHOD

(75) Inventors: Erich James Plondke, Austin, TX (US); Lucian Codrescu, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1149 days.

(21) Appl. No.: 12/405,271

(22) Filed: Mar. 17, 2009

(65) Prior Publication Data

US 2010/0242041 A1 Sep. 23, 2010

(51) Int. Cl.
  *G06F 9/46* (2006.01)
  *G06F 9/38* (2006.01)
  *G06F 9/48* (2006.01)

(52) U.S. Cl.
  CPC ............ *G06F 9/3851* (2013.01); *G06F 9/4812* (2013.01); *G06F 9/4881* (2013.01)

(58) Field of Classification Search
  None
  See application file for complete search history.

(56) References Cited

U.S. PATENT DOCUMENTS

| | | | |
|---|---|---|---|
| 5,168,566 A | 12/1992 | Kuki et al. | |
| 6,076,157 A | 6/2000 | Borkenhagen et al. | |
| 7,257,814 B1 | 8/2007 | Melvin et al. | |
| 7,360,064 B1 * | 4/2008 | Steiss et al. | 712/219 |
| 2003/0154234 A1 | 8/2003 | Larson | |
| 2005/0022196 A1 | 1/2005 | Davis et al. | |
| 2005/0125793 A1 * | 6/2005 | Aguilar et al. | 718/100 |
| 2005/0188373 A1 | 8/2005 | Inoue et al. | |
| 2005/0289552 A1 * | 12/2005 | Cavallo | 718/103 |
| 2006/0136915 A1 | 6/2006 | Aingaran et al. | |
| 2009/0150891 A1 * | 6/2009 | Matsa et al. | 718/103 |

FOREIGN PATENT DOCUMENTS

| | | |
|---|---|---|
| JP | 8036553 A | 2/1996 |
| JP | 2004503864 A | 2/2004 |
| TW | 200612342 | 4/2006 |
| TW | I252432 B | 4/2006 |
| WO | WO2006110914 A2 | 10/2006 |
| WO | WO2007048132 | 4/2007 |

OTHER PUBLICATIONS

International Search Report and Written Opinion—PCT/US2010/027453, International Search Authority—European Patent Office—Oct. 20, 2010.
Supplementary European Search Report—EP10753971, International Search Authority—European Patent Office—Dec. 22, 2011.
Taiwan Search Report—TW099107933—TIPO—Jul. 9, 2013.

* cited by examiner

*Primary Examiner* — William B Partridge
(74) *Attorney, Agent, or Firm* — Peter Michael Kamarchik; Nicholas J. Pauley; Paul Holdaway

(57) ABSTRACT

In a particular embodiment, a method is disclosed that includes receiving an interrupt at a first thread, the first thread including a lowest priority thread of a plurality of executing threads at a processor at a first time. The method also includes identifying a second thread, the second thread including a lowest priority thread of a plurality of executing threads at a processor at a second time. The method further includes directing a subsequent interrupt to the second thread.

27 Claims, 12 Drawing Sheets

REAL TIME MULTITHREADED SCHEDULER AND SCHEDULING METHOD

FIELD OF THE DISCLOSURE

The present disclosure is generally directed to a real-time multithreaded scheduler and scheduling method.

BACKGROUND

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, wireless telephones can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Digital signal processors (DSPs), image processors, and other processing devices are frequently used in portable personal computing devices and operate in conjunction with an operating system. One requirement of a real-time operating system (RTOS) is strict priority scheduling. On a single processor, the requirement is that the highest priority executable task should be scheduled. Typically, in a multithreaded or multiprocessor system with multiple central processing units (CPUs), a specific task is bound to a specific hardware thread or CPU and a single-processor scheduler algorithm is run on each hardware thread or CPU independently. This approach does not satisfy the RTOS constraint that the highest priority executable tasks overall should be scheduled, and it requires knowledge of what hardware thread or CPU to schedule the task on ahead of time, knowledge that may not be available.

SUMMARY

In a particular embodiment, a method is disclosed that includes receiving an interrupt at a first thread, the first thread including a lowest priority thread of a plurality of executing threads at a processor at a first time. The method also includes identifying a second thread, the second thread including a lowest priority thread of a plurality of executing threads at a processor at a second time. The method further includes directing a subsequent interrupt to the second thread.

In another embodiment, a method is disclosed that includes receiving an interrupt at a first thread of a set of threads. Each thread of the set of threads executes a respective task of a set of executing tasks. Each task of the set of executing tasks and each task of a set of ready tasks has a respective priority. The method also includes iteratively swapping a lowest priority task of the set of executing tasks with a highest priority task of the set of ready tasks until each task of the set of executing tasks has a priority that is greater than or equal to a priority of every task of the set of ready tasks.

In another embodiment, a system is disclosed that includes a multithreaded processor configured to execute a plurality of threads such that a plurality of executing threads are running the highest priority tasks. The multithreaded processor is configured to schedule tasks such that executing tasks have a priority at least as high as a highest priority of all ready tasks.

In another embodiment, a computer-readable medium is disclosed. The computer-readable medium contains computer executable instructions that are executable to cause a computer to direct an interrupt to a lowest priority thread of a plurality of executing threads. The interrupt indicates at least one task is ready to be executed. The lowest priority thread of the plurality of executing threads is either executing a lowest priority task or is an idle thread. The lowest priority thread of the plurality of executing threads receives the interrupt and initiates an interrupt routine to select a highest priority task from a ready task list.

One particular advantage provided by disclosed embodiments is that tasks are scheduled so that the highest priority threads are executed with reduced disturbance from interrupts. Because a low priority thread receives interrupts, raising a reschedule interrupt automatically reschedules the low priority thread without disturbing the highest priority threads. Additionally, an external interrupt will interrupt the lowest priority thread rather than the highest priority threads.

Another particular advantage provided by disclosed embodiments is that in the scenario where multiple tasks are made ready to execute and are higher priority than more than one running task, the low priority running tasks are swapped with the new higher priority tasks with the minimum number of swaps, and without overhead to the other high priority tasks running.

Another advantage provided by disclosed embodiments is that a priority of the interrupt handler thread may be compared directly to a priority of the currently-running thread. If the currently-running thread has a lower priority than the interrupt handler thread, then the interrupt handler thread may be scheduled immediately.

Other aspects, advantages, and features of the present disclosure will become apparent after review of the entire application, including the following sections: Brief Description of the Drawings, Detailed Description, and the Claims.

DETAILED DESCRIPTION

Figure 1:
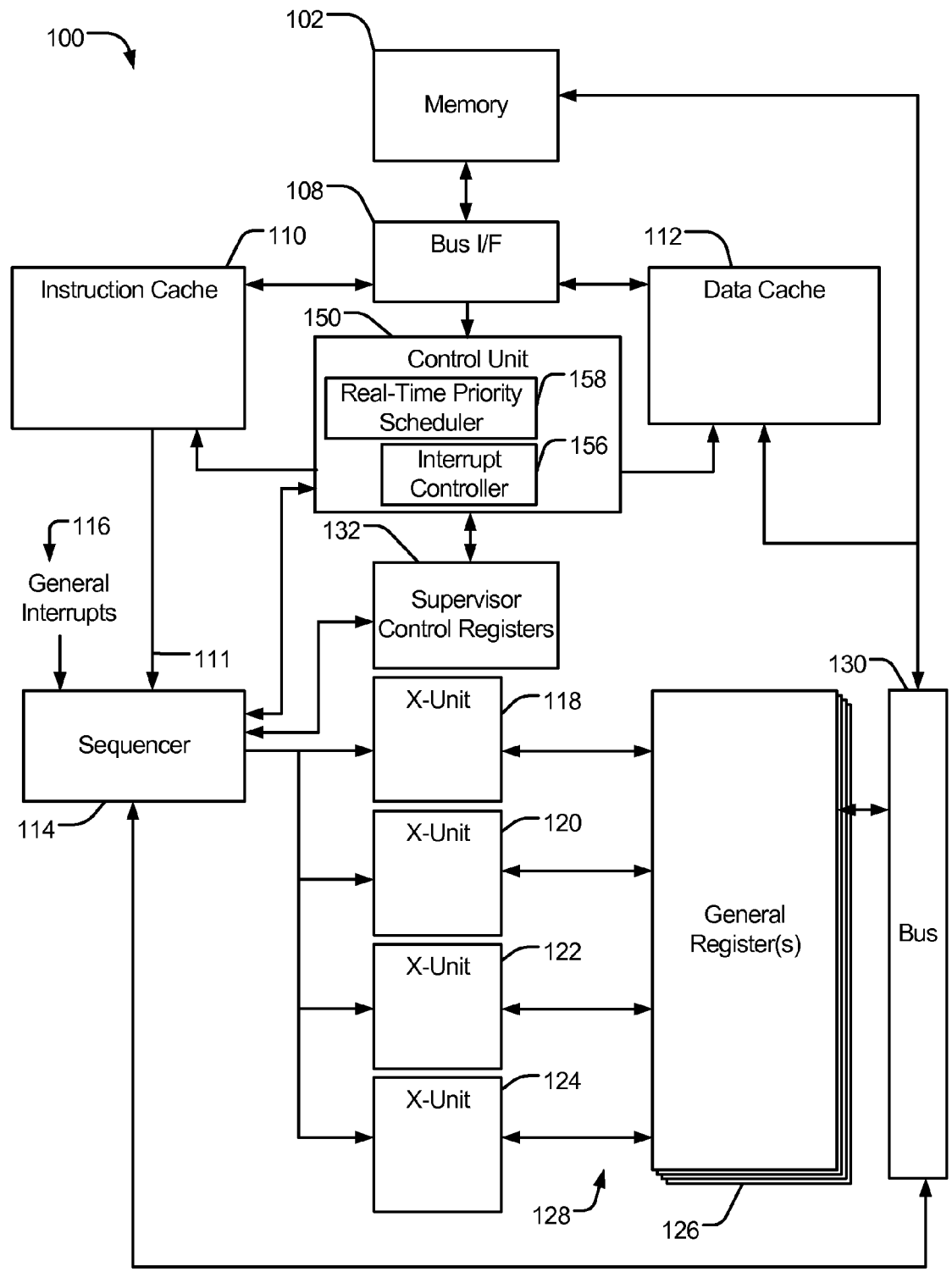
FIG. 1 is a block diagram of a particular illustrative embodiment of a processing system.

Referring to FIG. 1, a particular illustrative embodiment of a processing system is depicted and generally designated 100. The multithreaded processor 100 includes a memory 102 that is coupled to an instruction cache 110 via a bus interface 108. The multithreaded processor 100 also includes a data cache 112 that is coupled to the memory 102 via the bus interface 108. The instruction cache 110 is coupled to a sequencer 114 via a bus 111. In a particular example, the sequencer 114 can also receive general interrupts 116, which may be retrieved from an interrupt register (not shown). In a particular embodiment, the instruction cache 110 may be coupled to the sequencer 114 via a plurality of current instruction registers, which may be coupled to the bus 111 and associated with particular threads of the multithreaded processor 100. In a particular embodiment, the multithreaded processor 100 is an interleaved multithreaded processor including six threads.

In a particular embodiment, the bus 111 is a sixty-four (64)-bit bus and the sequencer 114 is configured to retrieve instructions from the memory 102 via instruction packets that include multiple instructions having a length of thirty-two (32) bits each. The bus 111 is coupled to a first instruction execution unit 118, a second instruction execution unit 120, a third instruction execution unit 122, and a fourth instruction execution unit 124. Each instruction execution unit 118, 120, 122, 124 can be coupled to a general register file 126 via a second bus 128. The general register file 126 can also be coupled to the sequencer 114 and to the data cache 112 and to the memory 102 via a third bus 130.

The multithreaded processor 100 may also include supervisor control registers 132 to store one or more priority settings that may be accessed by a control unit 150 that includes a real-time priority scheduler 158 and an interrupt controller 156 to determine what tasks to execute on each of the processing threads. The real-time priority scheduler 158 may be implemented as a software routine. Each processing thread may have one or more associated priority settings, such as one or more bit values stored at a supervisor status register that is dedicated to the particular thread.

During operation, the multithreaded processor 100 executes a plurality of threads such that a plurality of executing threads are running highest priority tasks, where the multithreaded processor 100 schedules tasks such that all executing tasks have a priority at least as high as a highest priority of all ready tasks. In a particular embodiment, the real-time priority scheduler 158 schedules tasks such that all executing tasks have a priority at least as high as a highest priority of all ready tasks. In a particular embodiment, the multithreaded processor 100 is configured such that an interrupt directed to a lowest priority thread of the plurality of executing threads does not impact performance of highest priority threads of the plurality of executing threads. For example, the interrupt controller 156 may be configured such that an interrupt directed to the lowest priority thread of the plurality of executing threads does not impact performance of the highest priority threads of the plurality of executing threads. As used herein, an interrupt may be anything that stops normal execution and begins execution of a special handler. An interrupt may mean any breaking of the normal program flow.

In a particular embodiment, the multithreaded processor 100 is configured such that the lowest priority thread of the plurality of executing threads receives an interrupt and runs an interrupt routine to select a highest priority task from a ready task list. For example, the interrupt controller 156 may be configured such that the lowest priority thread of the plurality of executing threads receives an interrupt and the real-time priority scheduler 158 may run an interrupt routine to select a highest priority task from a ready task list. The interrupt logic may be configured such that only the lowest priority thread is able to take the interrupt. In a particular embodiment, the multithreaded processor 100 is configured such that, after each swapping of tasks to execute a highest priority task of a ready task list and to return a prior executing task to the ready task list, a schedule is checked to determine if any ready task has a higher priority than any executing task. For example, the real-time priority scheduler 158 may check a schedule to determine if any ready task has a higher priority than any executing task, after each swapping of tasks to execute the highest priority task of the ready task list and to return the prior executing task to the ready task list.

In a particular embodiment, the multithreaded processor 100 is configured such that a schedule is updated using a minimum possible number of swaps of executing tasks and ready tasks so that the updated schedule has every executing task having a priority at least as high as a highest priority of the ready tasks. For example, the real-time priority scheduler 158 may be configured such that the schedule is updated using the minimum possible number of swaps of executing tasks and ready tasks so that the updated schedule has every executing task having a priority at least as high as a highest priority of the ready tasks.

Figure 2:
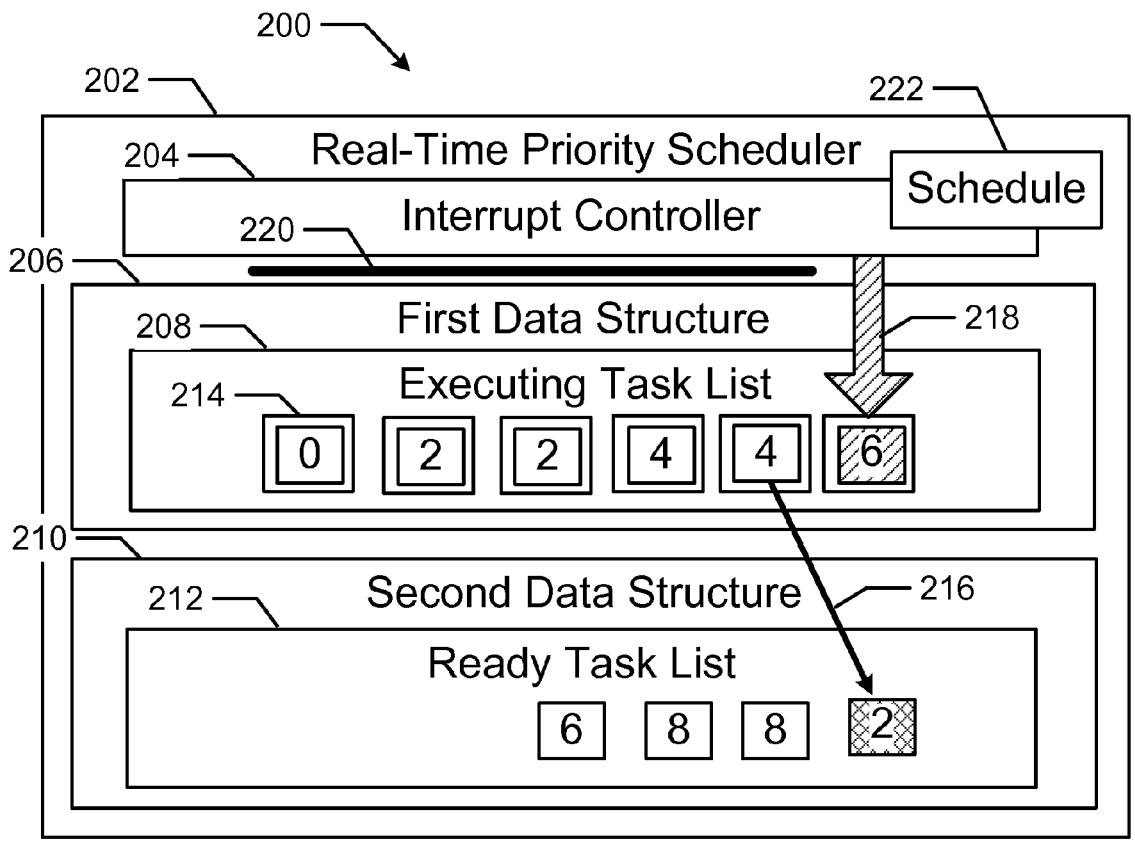
FIG. 2 is a block diagram of another particular illustrative embodiment of a processing system showing an interrupt directed to a lowest priority executing thread.

Referring to FIG. 2, a particular illustrative embodiment of a processing system is depicted and generally designated 200. In a particular embodiment, the multithreaded processor 200 is substantially similar to the multithreaded processor 100 of FIG. 1. The multithreaded processor 200 includes a real-time priority scheduler 202 coupled to an interrupt controller 204, an interrupt mask 220, a first data structure 206, and a second data structure 210. The first data structure 206 includes a prioritized executing task list 208 of tasks executing on a plurality of executing threads 214. The tasks are labeled by their respective priorities, with 0 labeling the highest priority tasks, 1 labeling the next highest priority tasks, and so forth. In a particular embodiment, idle tasks have the lowest priority. The second data structure 210 includes a prioritized ready task list 212 of tasks ready to execute on the plurality of executing threads 214. The interrupt controller 204 may be configured to direct an interrupt to a lowest priority thread of the plurality of executing threads 214, as shown by the arrow 218. The interrupt mask 220 may be a bit mask to indicate an availability of each thread to receive an interrupt. In a particular embodiment, the interrupt mask 220 is configured to direct an interrupt to a lowest priority thread of the plurality of executing threads 214, as shown by the arrow 218.

The real-time priority scheduler 202 may be configured to move a highest priority task from the prioritized ready task list 212 of the second data structure 210 to the prioritized executing task list 208 of the first data structure 206 to execute the highest priority task on an interrupted lowest priority thread. The real-time priority scheduler 202 may also be configured to check a schedule 222 to determine whether any ready tasks in the second data structure 210 have a higher priority than a lowest priority executing task in the first data structure 206. Checking the schedule 222 may include inspecting the first data structure 206 and the second data structure 210 to determine whether any ready tasks in the second data structure 210 have a higher priority than a lowest priority executing task in the first data structure 206. In a particular embodiment, the lowest priority thread of the plurality of executing threads 214 is executing a lowest priority task from the prioritized executing task list 208 of the first data structure 206. For example, the thread executing the task with a priority of 6 in FIG. 2 may be the lowest priority thread.

In operation, one of the two tasks with a priority of 4 executing on the plurality of executing threads 214 may launch or "wake up" a task with a priority of 2, as shown by the arrow 216. This priority 2 task appears on the prioritized ready task list 212 of the second data structure 210. The interrupt mask 220 masks off all the tasks executing on the plurality of executing threads 214 from the interrupt controller 204, except for the lowest priority thread, which is executing the priority 6 task. The interrupt controller 204 may direct an interrupt, as shown by the arrow 218, to the lowest priority thread of the plurality of executing threads 214, the thread that is executing the priority 6 task, in response to the launching or waking up of the priority 2 task.

Figure 3:
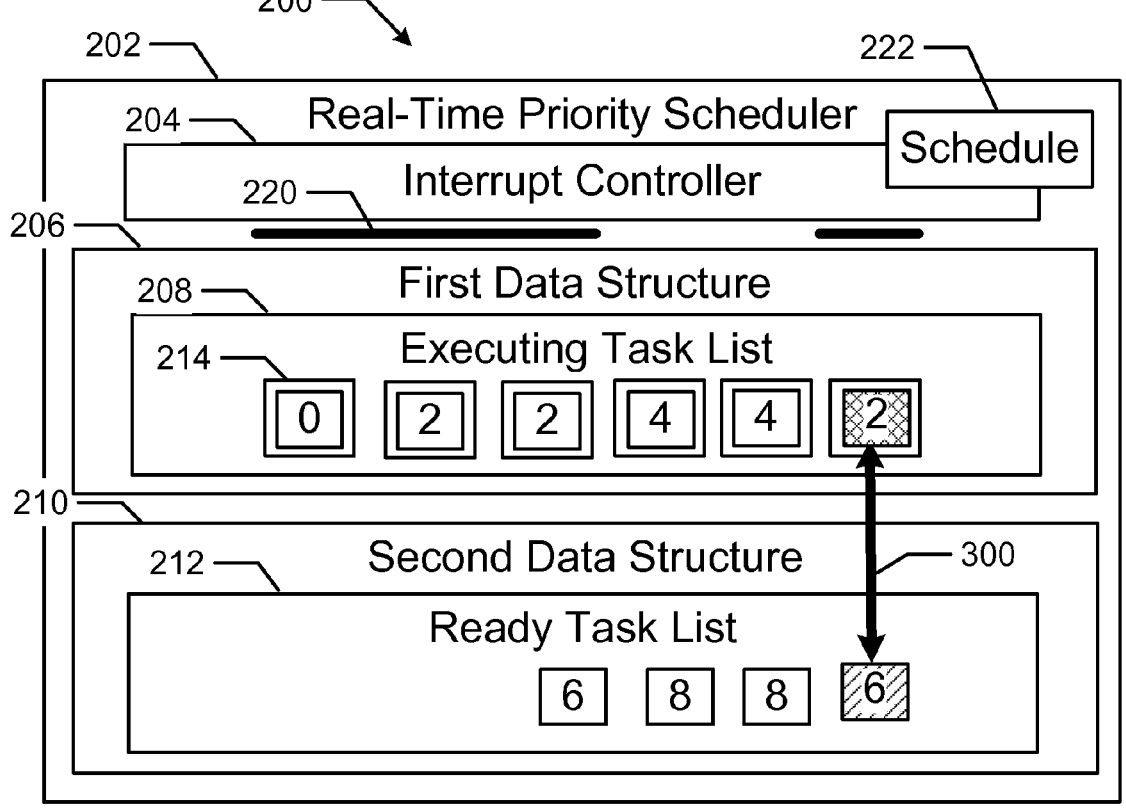
FIG. 3 is a block diagram of the particular illustrative embodiment of the processing system of FIG. 2, showing task swapping.

Referring to FIG. 3, the real-time priority scheduler 202 may move the highest priority task, the priority 2 task, from the prioritized ready task list 212 of the second data structure 210 to the prioritized executing task list 208 of the first data structure 206 to execute the highest priority task, the priority 2 task, on the interrupted lowest priority thread, as shown by the arrow 300. After swapping tasks to execute the highest priority task, the priority 2 task, from the prioritized ready task list 212 and to return a prior executing task, the priority 6 task, to the prioritized ready task list 212, as shown by the arrow 300, the real-time priority scheduler 202 may check the schedule 222 to determine whether any ready tasks in the second data structure 210 have a higher priority than a lowest priority executing task in the first data structure 206. In FIG. 3, after the swapping of the tasks shown by the arrow 300, the ready tasks in the second data structure 210 have either priority 6 or priority 8, where the lowest priority executing tasks in the first data structure 206 are the two priority 4 tasks, so none of the ready tasks in the second data structure 210 have a higher priority than the lowest priority executing tasks in the first data structure 206. The interrupt mask 220 masks off all the tasks executing on the plurality of executing threads 214 from the interrupt controller 204, except for the lowest priority threads, which are executing the priority 4 tasks.

Figure 4:
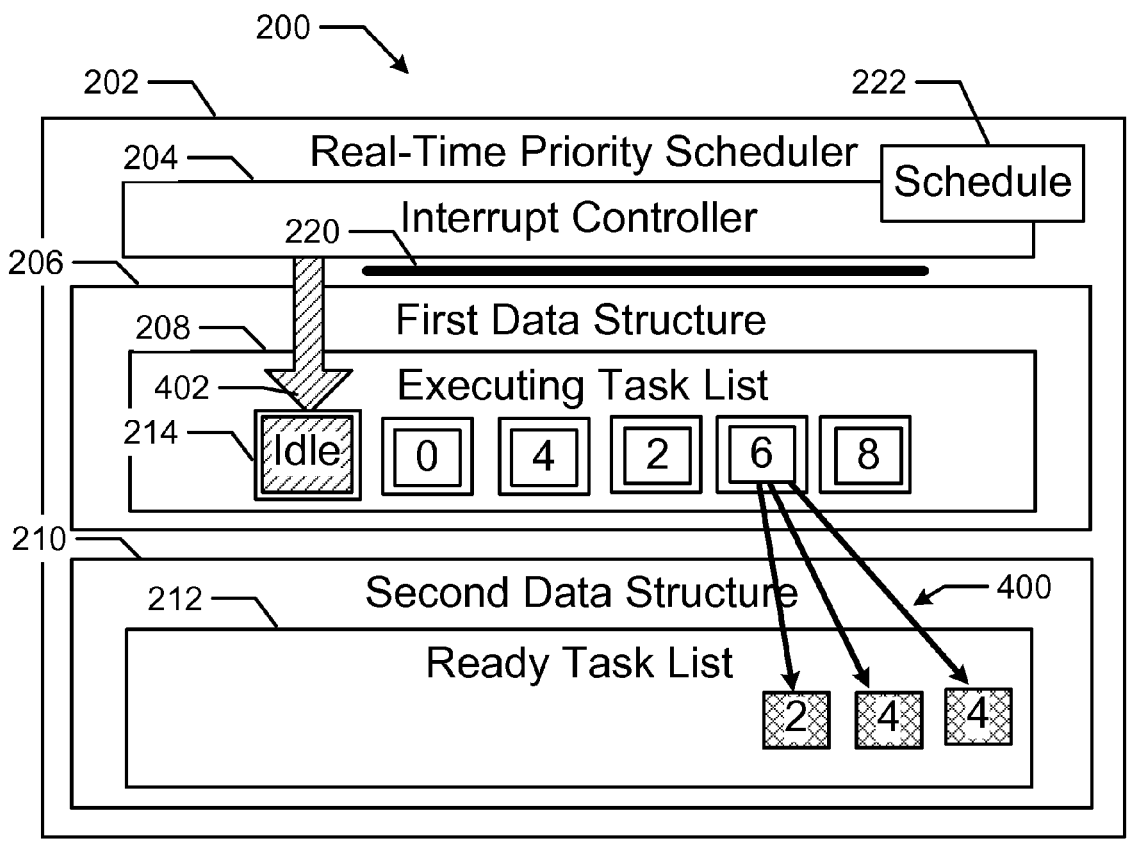
FIG. 4 is a block diagram of the particular illustrative embodiment of the processing system of FIG. 2, showing another interrupt directed to a lowest priority executing thread.

Referring to FIG. 4, as another example of operation, a task with a priority of 6 executing on the plurality of executing threads 214 may launch or "wake up" a task with a priority of 2 and two tasks with a priority of 4, as shown by the arrows 400. The priority 2 task and the two priority 4 tasks appear on the prioritized ready task list 212 of the second data structure 210. The interrupt mask 220 masks off all the tasks executing on the plurality of executing threads 214 from the interrupt controller 204, except for the lowest priority thread, which is idle. In response to the launching or waking up of the tasks, the interrupt controller 204 may direct an interrupt, as shown by the arrow 402, to the lowest priority thread of the plurality of executing threads 214. In a particular embodiment, the lowest priority thread of the plurality of executing threads 214 is an idle thread executing an idle task, which is defined as having the lowest priority on the prioritized executing task list 208 of the first data structure 206 due to its idle status.

Figure 5:
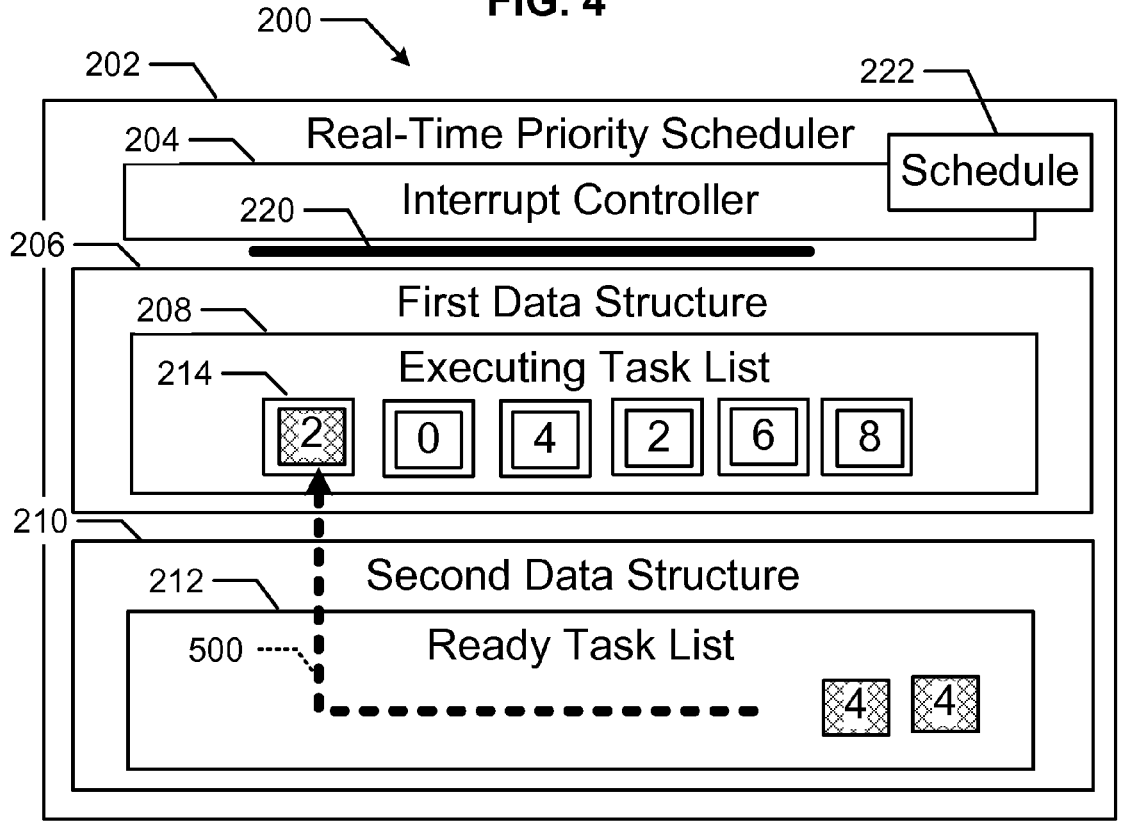
FIG. 5 is a block diagram of the particular illustrative embodiment of the processing system of FIG. 2, showing a task moving from a ready task list to an executing task list.

Referring to FIG. 5, the real-time priority scheduler 202 of FIG. 4 may move the highest priority task, the priority 2 task, from the prioritized ready task list 212 of the second data structure 210 to the prioritized executing task list 208 of the first data structure 206 to execute the highest priority task, the priority 2 task, on the interrupted lowest priority thread, as shown by the arrow 500. After moving the highest priority task, the priority 2 task, from the prioritized ready task list 212, as shown by the arrow 500, the real-time priority scheduler 202 may check the schedule 222 to determine whether any ready tasks in the second data structure 210 have a higher priority than a lowest priority executing task in the first data structure 206. In FIG. 5, after the moving of the task shown by the arrow 500, the ready tasks in the second data structure 210 both have priority 4, where the lowest priority executing task in the first data structure 206 is the priority 8 task, so both of the ready tasks in the second data structure 210 have a higher priority than the lowest priority executing task in the first data structure 206. The interrupt mask 220 masks off all the tasks executing on the plurality of executing threads 214 from the interrupt controller 204, except for the lowest priority thread, which is executing the priority 8 task.

Figure 6:
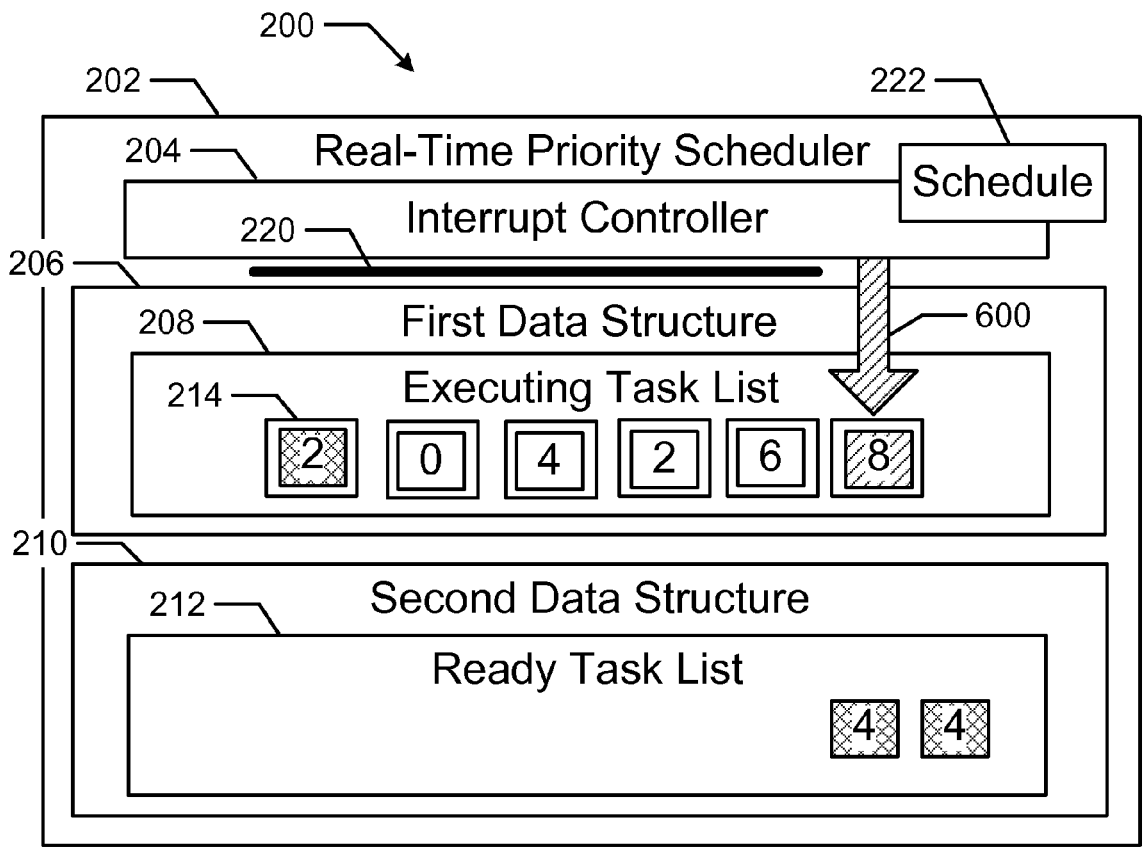
FIG. 6 is a block diagram of the particular illustrative embodiment of the processing system of FIG. 2, showing another interrupt directed to a lowest priority executing thread.

Referring to FIG. 6, the two priority 4 tasks remain on the prioritized ready task list 212 of the second data structure 210. The interrupt mask 220 has masked off all the tasks executing on the plurality of executing threads 214 from the interrupt controller 204, except for the lowest priority thread, which is executing the priority 8 task. The interrupt controller 204 may direct an interrupt, as shown by the arrow 600, to the lowest priority thread of the plurality of executing threads 214, the thread that is executing the priority 8 task.

Figure 7:
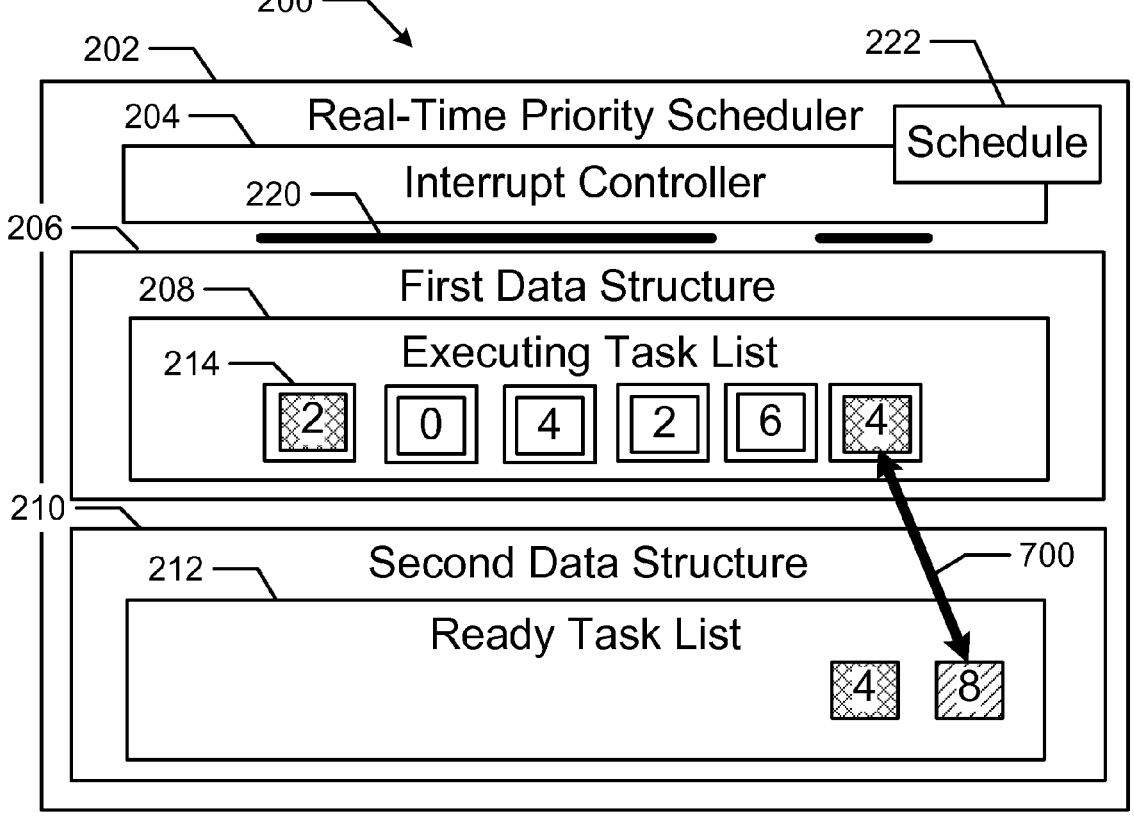
FIG. 7 is a block diagram of the particular illustrative embodiment of the processing system of FIG. 2, showing task swapping.

Referring to FIG. 7, the real-time priority scheduler 202 may move the highest priority task, either of the priority 4 tasks, from the prioritized ready task list 212 of the second data structure 210 to the prioritized executing task list 208 of the first data structure 206 to execute the highest priority task, one of the priority 4 tasks, on the interrupted lowest priority thread, as shown by the arrow 700. After swapping tasks to execute the highest priority task, one of the priority 4 tasks, from the prioritized ready task list 212 and to return a prior executing task, the priority 8 task, to the prioritized ready task list 212, as shown by the arrow 700, the real-time priority scheduler 202 may check the schedule 222 to determine whether any ready tasks in the second data structure 210 have a higher priority than a lowest priority executing task in the first data structure 206. In FIG. 7, after the swapping of the tasks shown by the arrow 700, the ready tasks in the second data structure 210 have priority 4 and priority 8, where the lowest priority executing task in the first data structure 206 is the priority 6 task, so one of the ready tasks in the second data structure 210, the priority 4 task, has a higher priority than the lowest priority executing task in the first data structure 206. The interrupt mask 220 masks off all the tasks executing on the plurality of executing threads 214 from the interrupt controller 204, except for the lowest priority thread, which is executing the priority 6 task.

Figure 8:
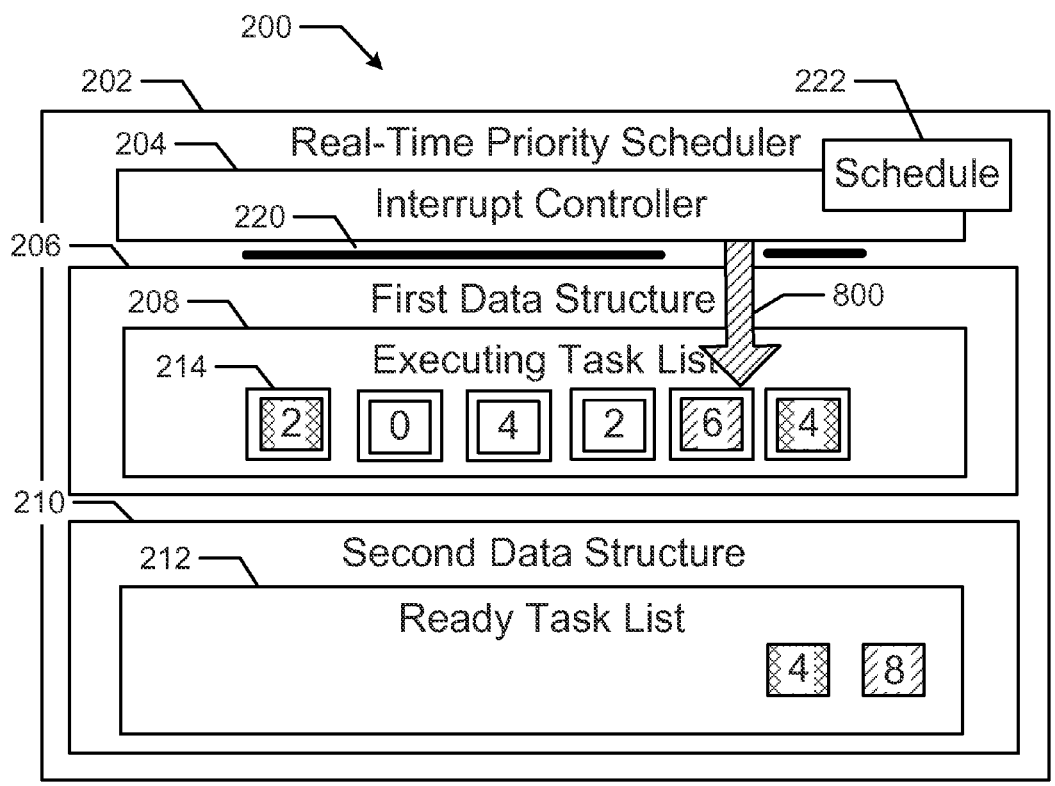
FIG. 8 is a block diagram of the particular illustrative embodiment of the processing system of FIG. 2, showing another interrupt directed to a lowest priority executing thread.

Referring to FIG. 8, the priority 4 task remains on the prioritized ready task list 212 of the second data structure 210 along with the priority 8 task. The interrupt mask 220 has masked off all the tasks executing on the plurality of executing threads 214 from the interrupt controller 204, except for the lowest priority thread, which is executing the priority 6 task. In response to the task swapping shown by the arrow 700 of FIG. 7, the interrupt controller 204 may direct an interrupt, as shown by the arrow 800, to the lowest priority thread of the plurality of executing threads 214, the thread that is executing the priority 6 task.

Figure 9:
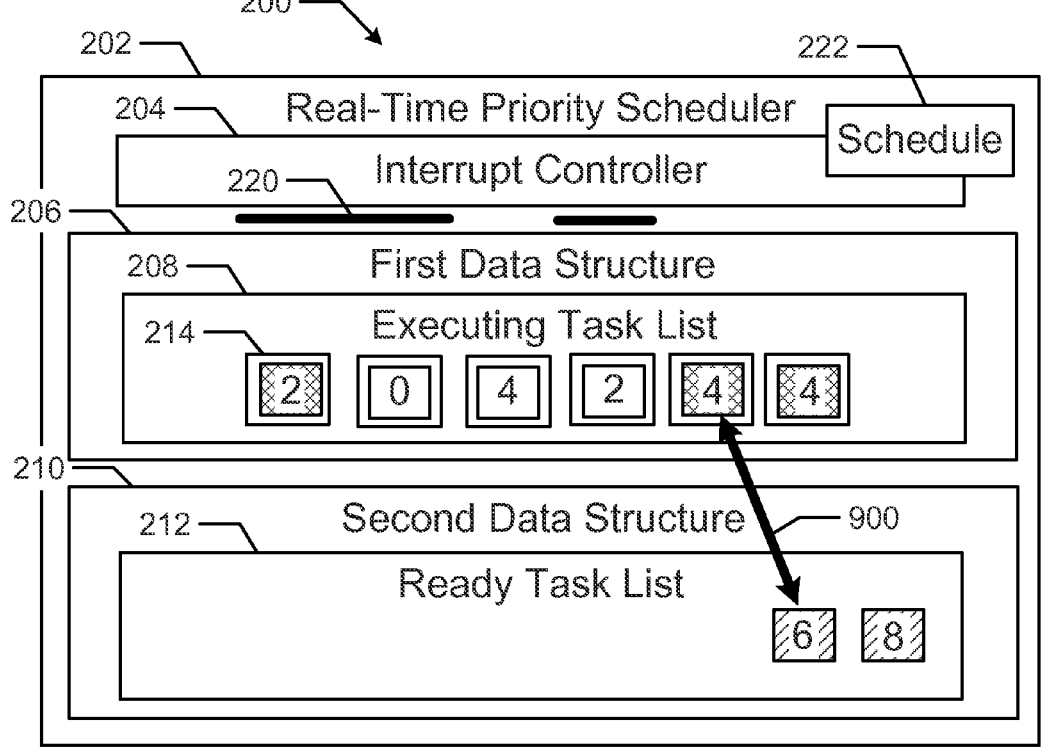
FIG. 9 is a block diagram of the particular illustrative embodiment of the processing system of FIG. 2, showing task swapping.

Referring to FIG. 9, the real-time priority scheduler 202 may move the highest priority task, the priority 4 task, from the prioritized ready task list 212 of the second data structure 210 to the prioritized executing task list 208 of the first data structure 206 to execute the highest priority task, the priority 4 task, on the interrupted lowest priority thread, as shown by the arrow 900. After swapping tasks to execute the highest priority task, the priority 4 task, from the prioritized ready task list 212 and to return a prior executing task, the priority 6 task, to the prioritized ready task list 212, as shown by the arrow 900, the real-time priority scheduler 202 may check the schedule 222 to determine whether any ready tasks in the second data structure 210 have a higher priority than a lowest priority executing task in the first data structure 206. In FIG. 9, after the swapping of the tasks shown by the arrow 900, the ready tasks in the second data structure 210 have priority 6 and priority 8, where the lowest priority executing tasks in the first data structure 206 are the priority 4 tasks, so none of the ready tasks in the second data structure 210 have a higher priority than the lowest priority executing tasks in the first data structure 206. The interrupt mask 220 masks off all the tasks executing on the plurality of executing threads 214 from the interrupt controller 204, except for the lowest priority threads, which are executing the priority 4 tasks.

Figure 10A:
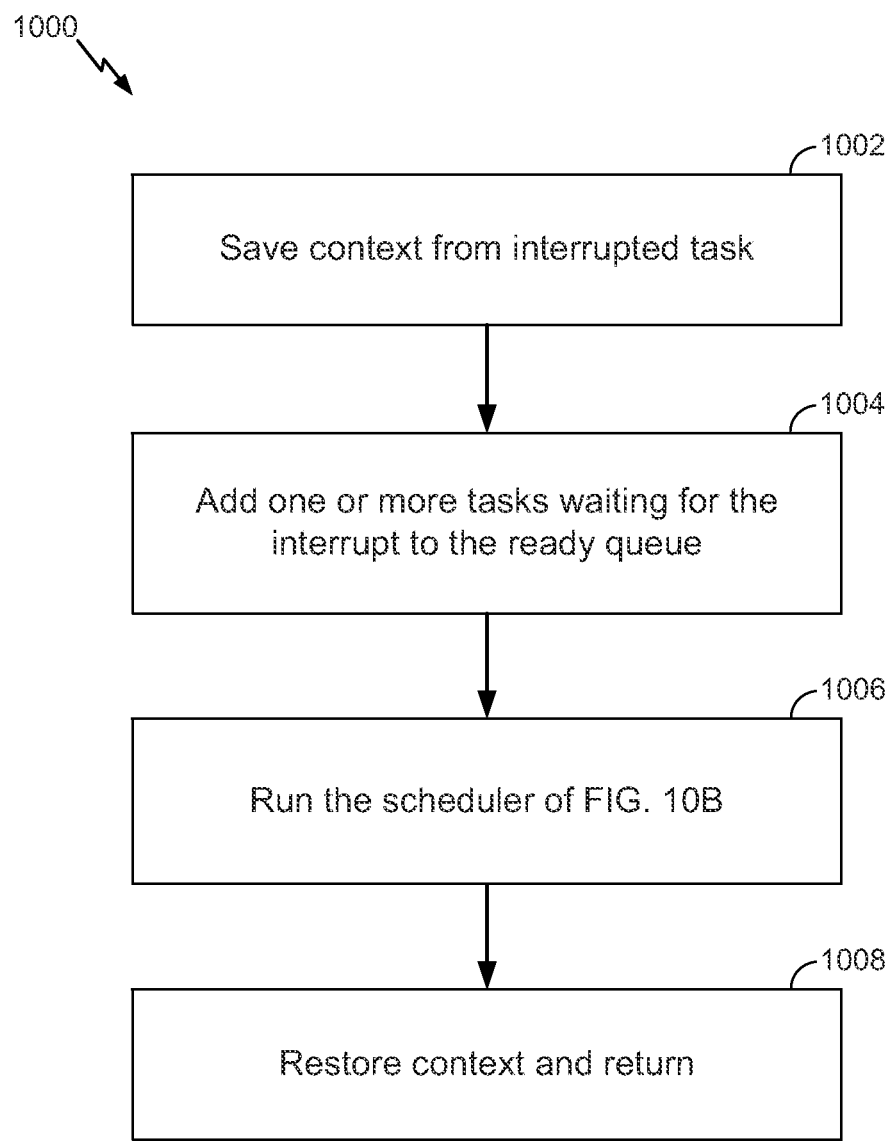
FIGS. 10A-10C are flow diagrams of a first illustrative embodiment of a method to schedule tasks in real-time on a multithreaded processor.

Referring to FIG. 10A, a flow diagram of a first illustrative embodiment of a method to schedule tasks in real-time on a multithreaded processor is depicted and generally designated 1000. In a particular embodiment, the method 1000 is implemented on the multithreaded processor 100 of FIG. 1. The method 1000 includes receiving an interrupt and saving the context from an interrupted task, at 1002. The method 1000 also includes adding one or more tasks waiting for the interrupt to a ready queue, at 1004. In a particular embodiment, the ready queue corresponds to the second data structure 210 shown in FIG. 2 that includes the prioritized ready task list 212 of tasks ready to execute on the plurality of executing threads 214.

Figure 10B:
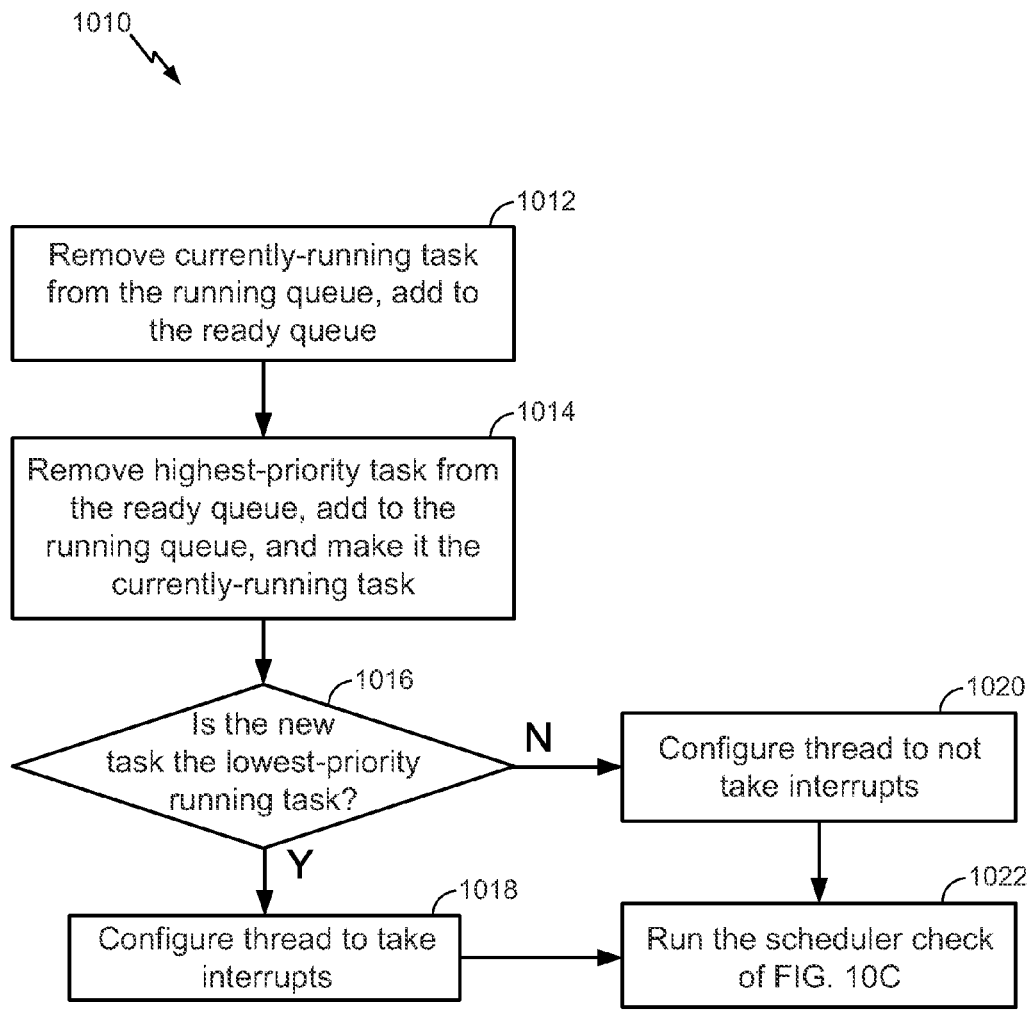

The method 1000 further includes running the scheduler algorithm shown in FIG. 10B, at 1006. The method 1000 also includes restoring the context and returning to uninterrupted operation, at 1008. Restoring the context and returning to uninterrupted operation may happen at a later point in time, as the scheduler may run other tasks before returning to the interrupted task.

Referring to FIG. 10B, the scheduler algorithm is shown at 1010. The scheduler algorithm 1010 includes removing a currently running task from a running queue and adding that task to the ready queue, at 1012. In a particular embodiment, the running queue corresponds to the first data structure 206 shown in FIG. 2 that includes the prioritized executing task list 208 of tasks executing on the plurality of executing threads 214. The scheduler algorithm 1010 also includes removing the highest priority task from the ready queue and adding that task to the running queue, making that task the new currently running task, at 1014. The scheduler algorithm 1010 further includes determining whether the new currently running task is the lowest priority running task, at 1016. If the new currently running task is the lowest priority running task, then the thread on which the new currently running task is running is configured to take interrupts, at 1018. If the new currently running task is not the lowest priority running task, then the thread on which the new currently running task is running is configured not to take interrupts, at 1020. The scheduler algorithm 1010 further includes running the scheduler check shown in FIG. 10C, at 1022.

Figure 10C:
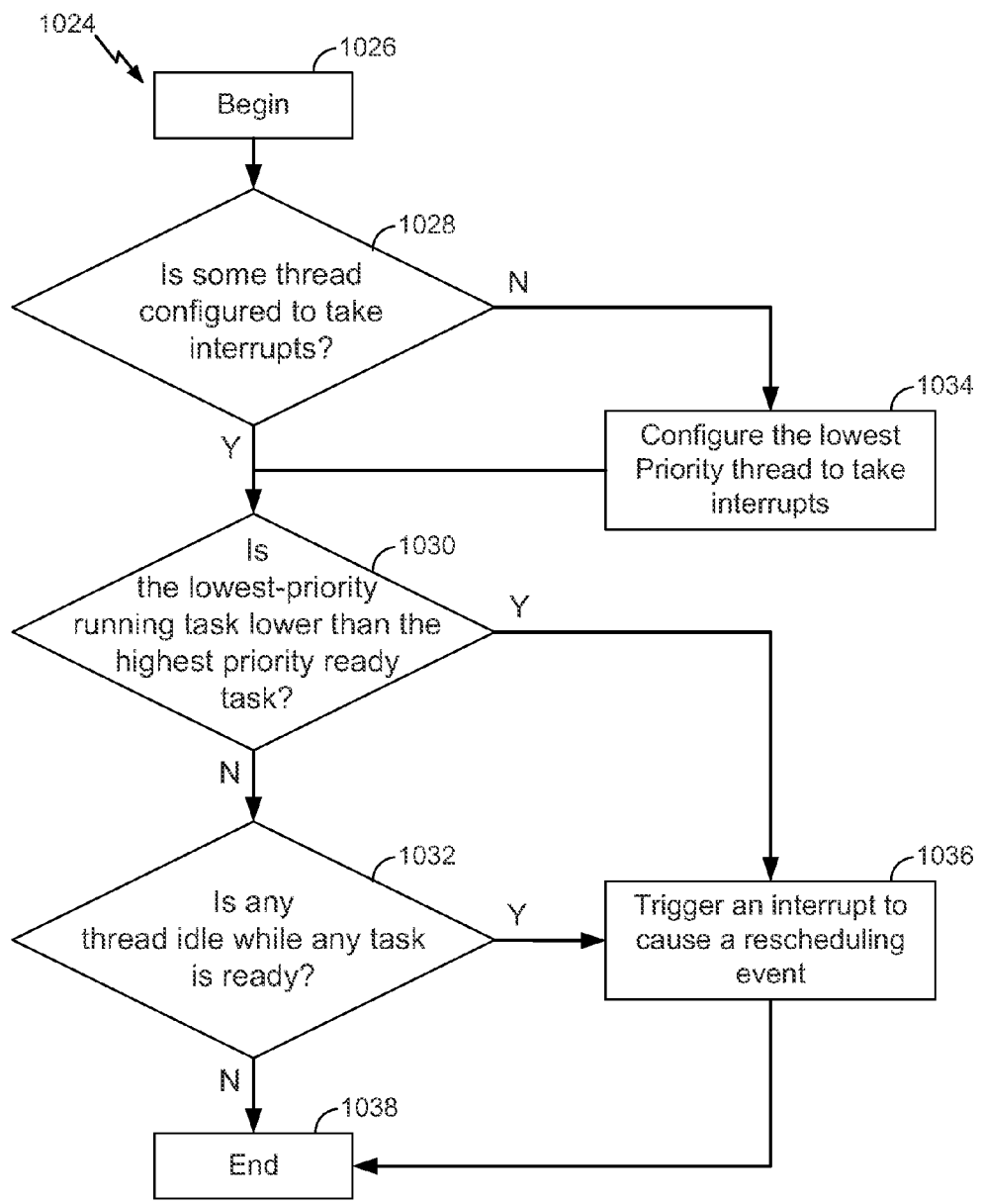

Referring to FIG. 10C, the scheduler check is shown at 1024. The scheduler check 1024 begins at 1026. The scheduler check 1024 includes determining whether some thread is configured to take interrupts, at 1028. If no thread is configured to take interrupts, then the lowest priority thread (or threads) is configured to take interrupts, at 1034. The scheduler check 1024 also includes determining whether the lowest priority running task has a lower priority than the highest priority ready task, at 1030. If the lowest priority running task has a lower priority than the highest priority ready task, then an interrupt is triggered to cause a rescheduling event, at 1036, and the scheduler check 1024 ends, at 1038.

If the lowest priority running task does not have a lower priority than the highest priority ready task, then the scheduler check 1024 further includes determining whether any thread is idle while any task is ready, at 1032. If any thread is idle while any task is ready, then an interrupt is triggered to cause a rescheduling event, at 1036, and the scheduler check 1024 ends, at 1038. If no thread is idle while any task is ready, the scheduler check 1024 ends, at 1038. In a particular embodiment, the interrupt controller is already set up such that the interrupt triggered at 1036 will be delivered to the lowest priority thread or an idle thread.

Figure 11:
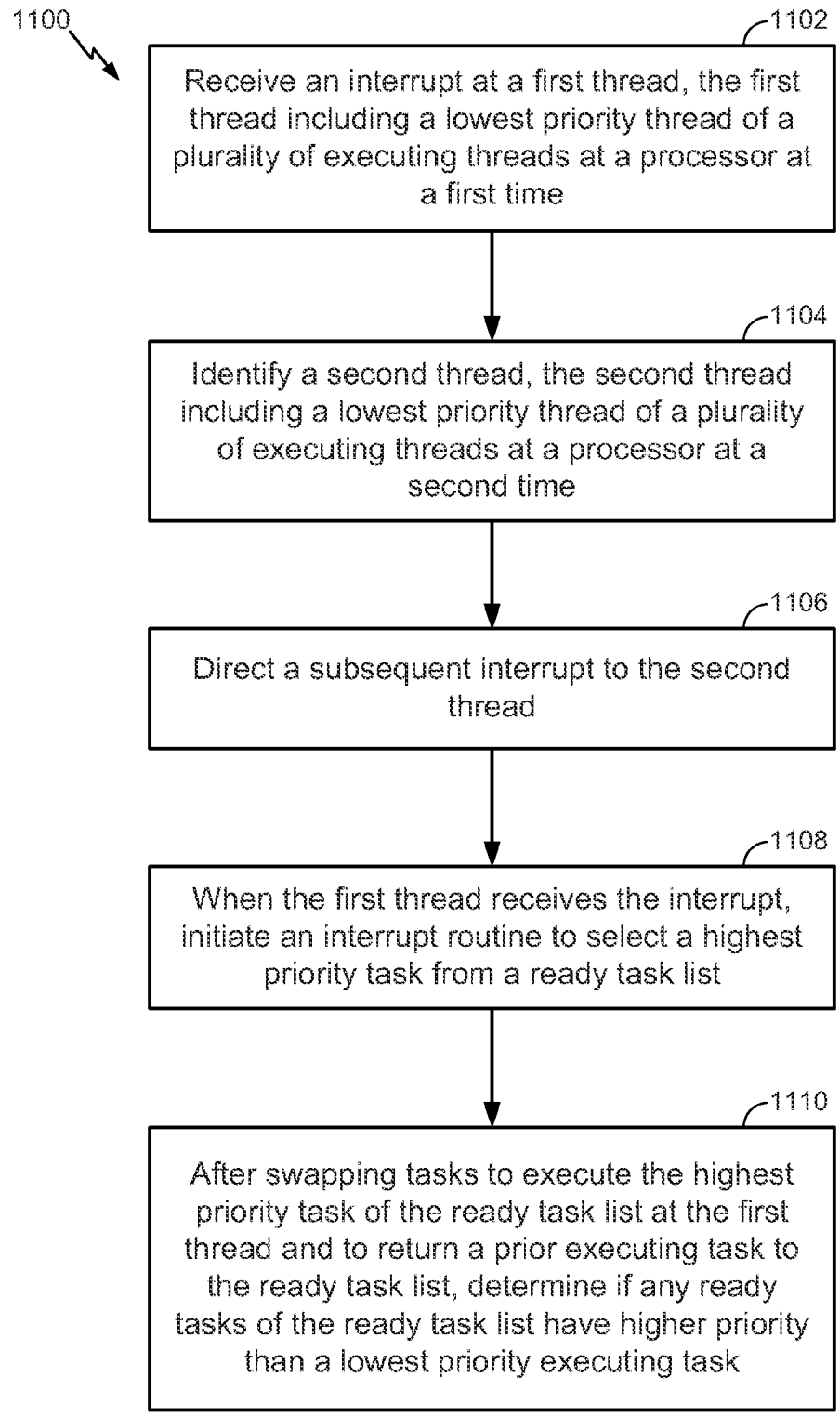
FIG. 11 is a flow diagram of a second illustrative embodiment of a method to schedule tasks in real-time on a multithreaded processor.

Referring to FIG. 11, a flow diagram of a second illustrative embodiment of a method to schedule tasks in real-time on a multithreaded processor is depicted and generally designated 1100. In a particular embodiment, the method 1100 is implemented on the multithreaded processor 100 of FIG. 1. The method 1100 includes receiving an interrupt at a first thread, the first thread including a lowest priority thread of a plurality of executing threads at a processor at a first time, at 1102. The method 1100 also includes identifying a second thread, the second thread including a lowest priority thread of a plurality of executing threads at a processor at a second time, at 1104. In a particular embodiment, the second thread is different from the first thread. The method 1100 further includes directing a subsequent interrupt to the second thread, at 1106. For example, interrupts may be directed to the lowest priority threads of the plurality of executing threads 214, as shown by the arrow 218 of FIG. 2, the arrow 402 of FIG. 4, the arrow 600 of FIG. 6, and the arrow 800 of FIG. 8, as described above. In a particular embodiment, the interrupt indicates at least one task is ready to be executed. For example, the interrupt shown by the arrow 218 of FIG. 2 may indicate that a priority 2 task is ready to be executed, the interrupt shown by the arrow 402 of FIG. 4 may indicate that a priority 2 task is ready to be executed, the interrupt shown by the arrow 600 of FIG. 6 may indicate that a priority 4 task is ready to be executed, and the interrupt shown by the arrow 800 of FIG. 8 may indicate that a priority 4 task is ready to be executed.

In a particular embodiment, the first thread is executing a lowest priority task of a plurality of executing tasks. For example, the lowest priority thread of the plurality of executing threads 214 of FIG. 2 may be executing a priority 6 task, the lowest priority threads of FIG. 3 are executing priority 4 tasks, the lowest priority thread of FIG. 5 and FIG. 6 may be executing a priority 8 task, the lowest priority thread of FIG. 7 and FIG. 8 may be executing a priority 6 task, and the lowest priority threads of FIG. 9 are executing priority 4 tasks. In a particular embodiment, the first thread is an idle thread. For example, the lowest priority thread of the plurality of executing threads 214 of FIG. 4 may be an idle thread. In a particular embodiment, an idle thread is executing an idle task.

The method 1100 also includes, when the first thread receives the interrupt, running an interrupt routine to select a highest priority task from a ready task list, at 1108. A first priority of the highest priority task from the ready task list may be compared to a second priority of a lowest priority task from an executing task list and tasks are swapped only when the first priority is higher than the second priority. For example, in FIG. 2, when the lowest priority thread, the one executing the priority 6 task, of the plurality of executing threads 214 receives the interrupt, as shown by the arrow 218, an interrupt routine may be run to select the highest priority task, the priority 2 task, from the prioritized ready task list 212.

The method 1100 further includes, after swapping tasks to execute the highest priority task of the ready task list at the first thread and to return a prior executing task to the ready task list, determining if any ready tasks of the ready task list have higher priority than a lowest priority executing task, at 1110. For example, after swapping the priority 2 task and the priority 6 task, as shown by the arrow 300 of FIG. 3, it may be determined that no ready tasks of the prioritized ready task list 212, with priority 6 and priority 8, have higher priority than the lowest priority executing tasks of the prioritized executing task list 208, with priority 4. Similarly, after swapping the priority 4 task and the priority 8 task, as shown by the arrow 700 of FIG. 7, it may be determined that one ready task of the prioritized ready task list 212, with priority 4, has higher priority than the lowest priority executing task of the prioritized executing task list 208, with priority 6.

In a particular embodiment, the method 1100 may be repeated as necessary to check a schedule to determine if any additional ready task has a higher priority than the current lowest priority executing task by comparing the lowest priority executing task to a highest priority ready task. Comparing the lowest priority executing task to the highest priority ready task may be one way of determining if any ready tasks of the ready task list have higher priority than the lowest priority executing task. For example, in FIG. 3, it may be determined that no ready tasks have higher priority than the lowest priority executing tasks, the priority 4 tasks, by comparing the priority 4 tasks to the highest priority ready tasks, the priority 6 tasks. Similarly, in FIG. 5, it may be determined that both ready tasks, with priority 4, have higher priority than the lowest priority executing task, the priority 8 task, by comparing the priority 8 task to the highest priority ready tasks, the priority 4 tasks.

In a particular embodiment, the method 1100 further includes determining the lowest priority executing task and using an interrupt routine to direct the subsequent interrupt to the second thread, where the second thread is executing the lowest priority executing task. For example, after swapping the priority 4 task and the priority 8 task, as shown by the arrow 700 of FIG. 7, it may be determined that the priority 6 task is the lowest priority executing task and an interrupt routine may be used to direct the subsequent interrupt, as shown by the arrow 800 of FIG. 8, to the lowest priority thread of the plurality of executing threads 214 that is executing the priority 6 task.

In a particular embodiment, the method 1100 further includes selectively setting the subsequent interrupt based on a result of checking a schedule to determine if any ready task has a higher priority than the lowest priority executing task. For example, the subsequent interrupt, as shown by the arrow 800 of FIG. 8, may be selectively set based on the result of checking the schedule 222 in FIG. 7 and determining that one of the ready tasks, with priority 4, has higher priority than the priority 6 task, the lowest priority executing task.

In a particular embodiment, the interrupt controller 204 of FIGS. 2-9 directs threads of the plurality of executing threads 214 other than the lowest priority thread of the plurality of executing threads 214 to be masked from receiving the interrupt. For example, as shown in FIGS. 2-9, the interrupt controller 204 may direct the interrupt mask 220 to mask off the plurality of executing threads 214 from receiving the interrupt, except for the lowest priority thread of the plurality of executing threads 214.

Figure 12:
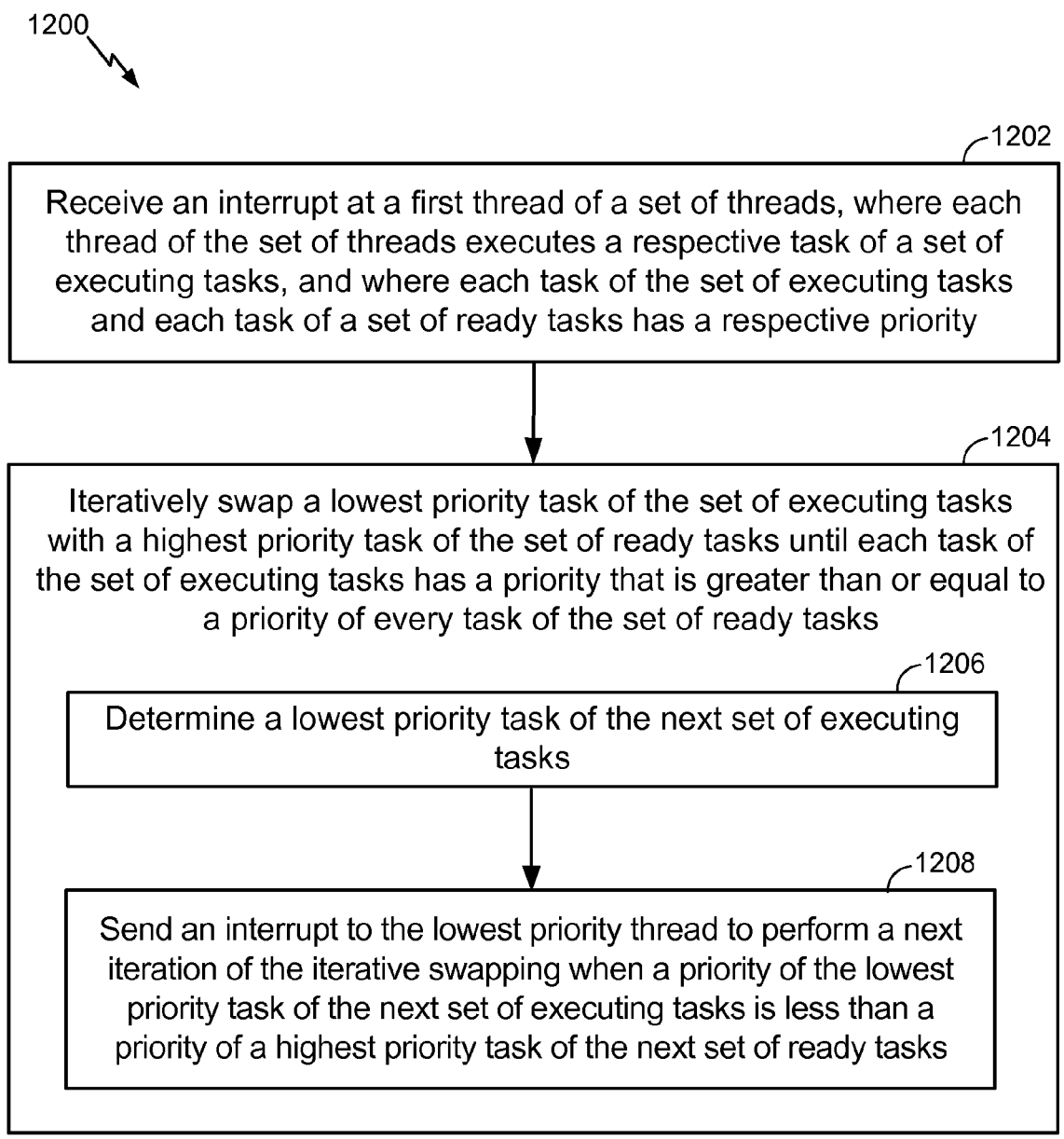
FIG. 12 is a flow diagram of a third illustrative embodiment of a method to schedule tasks in real-time on a multithreaded processor.

Referring to FIG. 12, a flow diagram of a third illustrative embodiment of a method to schedule tasks in real-time on a multithreaded processor is depicted and generally designated 1200. In a particular embodiment, the method 1200 is implemented on the multithreaded processor 100 of FIG. 1. The method 1200 includes receiving an interrupt at a first thread of a set of threads, where each thread of the set of threads executes a respective task of a set of executing tasks, and where each task of the set of executing tasks and each task of a set of ready tasks has a respective priority, at 1202. For example, as shown in FIG. 6, the thread executing the priority 8 task may receive the interrupt, as shown by the arrow 600, where each thread of the plurality of executing threads 214 executes a respective task of the prioritized executing task list 208, and where each task of the prioritized executing task list 208 and each task of the prioritized ready task list 212 has a respective priority. In a particular embodiment, an idle thread executes an idle task that has the lowest priority. For example, as shown in FIG. 4, the thread executing the idle task may receive the interrupt, as shown by the arrow 402.

The method 1200 also includes iteratively swapping a lowest priority task of the set of executing tasks with a highest priority task of the set of ready tasks until each task of the set of executing tasks has a priority that is greater than or equal to a priority of every task of the set of ready tasks, at 1204. For example, as shown in FIGS. 4-9, the lowest priority tasks of the prioritized executing task list 208 may be iteratively swapped with the respective highest priority tasks of the prioritized ready task list 212 until each task of the prioritized executing task list 208 has a priority that is greater than or equal to a priority of every task of the prioritized ready task list 212, as shown in FIG. 9.

In a particular embodiment, iterative swapping includes after swapping each executing task with a ready task to form a next set of executing tasks and a next set of ready tasks, determining a lowest priority task of the next set of executing tasks, at 1206. Each iteration of the iterative swapping may include determining a lowest priority task of the next set of executing tasks. For example, after swapping the priority 4 task with the priority 8 task, as shown by the arrow 700 of FIG. 7, the next set of executing tasks may include a priority 0 task, two priority 2 tasks, two priority 4 tasks, and a priority 6 task, and the next set of ready tasks may include a priority 4 task and a priority 8 task, where the priority 6 task may be determined to be the lowest priority task of the next set of executing tasks. Iterative swapping further includes sending an interrupt to the lowest priority thread to perform a next iteration of the iterative swapping when a priority of the lowest priority task of the next set of executing tasks is less than a priority of a highest priority task of the next set of ready tasks, at 1208. For example, as shown by the arrow 800 of FIG. 8, an interrupt may be sent to the priority 6 task, the lowest priority task of the next set of executing tasks, to perform a next iteration of the iterative swapping, since the priority 6 task has lower priority than the priority 4 task that has the highest priority of the next set of ready tasks.

Figure 13:
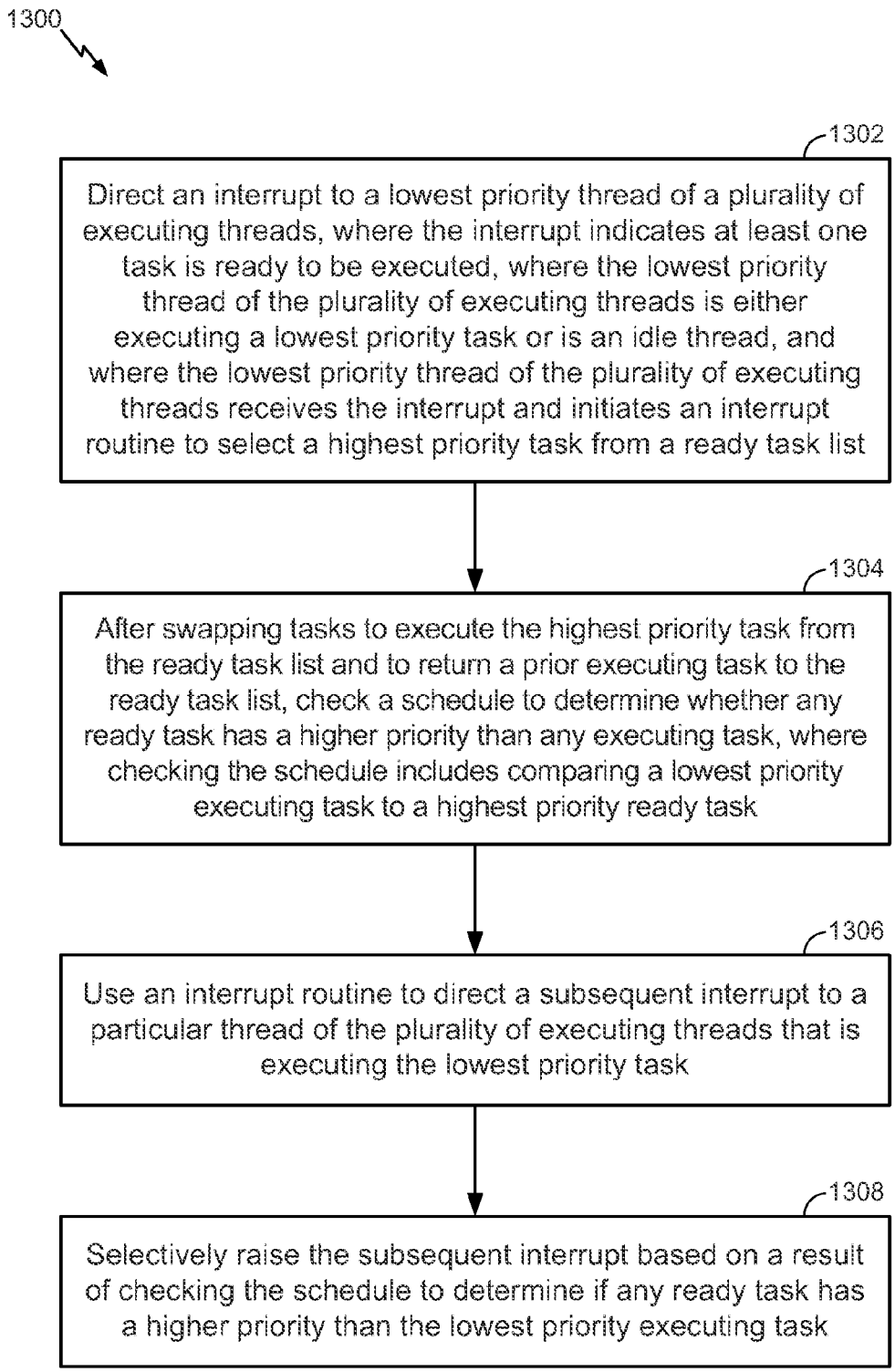
FIG. 13 is a flow diagram of a fourth illustrative embodiment of a method to schedule tasks in real-time on a multithreaded processor.

Referring to FIG. 13, a flow diagram of a fourth illustrative embodiment of a method to schedule tasks in real-time on a multithreaded processor is depicted and generally designated 1300. In a particular embodiment, the method 1300 is implemented on the multithreaded processor 100 of FIG. 1. The method 1300 includes directing an interrupt to a lowest priority thread of a plurality of executing threads, where the interrupt indicates at least one task is ready to be executed, where the lowest priority thread of the plurality of executing threads is either executing a lowest priority task or is an idle thread, and where the lowest priority thread of the plurality of executing threads receives the interrupt and initiates an interrupt routine to select a highest priority task from a ready task list, at 1302. For example, as shown by the arrow 218 of FIG. 2, an interrupt may be directed to a lowest priority thread of the plurality of executing threads 214, where the interrupt may indicate that a priority 2 task is ready to be executed, where the lowest priority thread may be executing a priority 6 task, the lowest priority task, and where the lowest priority thread executing the priority 6 task may receive the interrupt and may initiate an interrupt routine to select the priority 2 task, the highest priority task, from the prioritized ready task list 212.

The method 1300 also includes, after swapping tasks to execute the highest priority task from the ready task list and to return a prior executing task to the ready task list, checking a schedule to determine whether any ready tasks have higher priority than any executing task, where checking the schedule to determine if any ready task has a higher priority than any executing task includes comparing a lowest priority executing task to a highest priority ready task, at 1304. For example, after swapping the priority 4 task and the priority 8 task, as shown by the arrow 700 of FIG. 7, the schedule 222 may be checked to determine if any ready task has a higher priority than any executing task by comparing the priority 6 task, the lowest priority executing task, to the priority 4 task, the highest priority ready task.

The method 1300 further includes using an interrupt routine to direct a subsequent interrupt to a particular thread of the plurality of executing threads that is executing the lowest priority task, at 1306. For example, an interrupt routine may be used to direct a subsequent interrupt, as shown by the arrow 800 of FIG. 8, to the particular thread of the plurality of executing threads 214 that is executing the priority 6 task, the lowest priority task. The method 1300 also includes selectively raising or initiating the subsequent interrupt based on a result of checking the schedule to determine if any ready task has a higher priority than the lowest priority executing task, at 1308. For example, the subsequent interrupt, as shown by the arrow 800 of FIG. 8, may be selectively raised or initiated based on the result of checking the schedule 222 and determining that the priority 4 ready task has higher priority than the priority 6 executing task, the lowest priority executing task.

Figure 14:
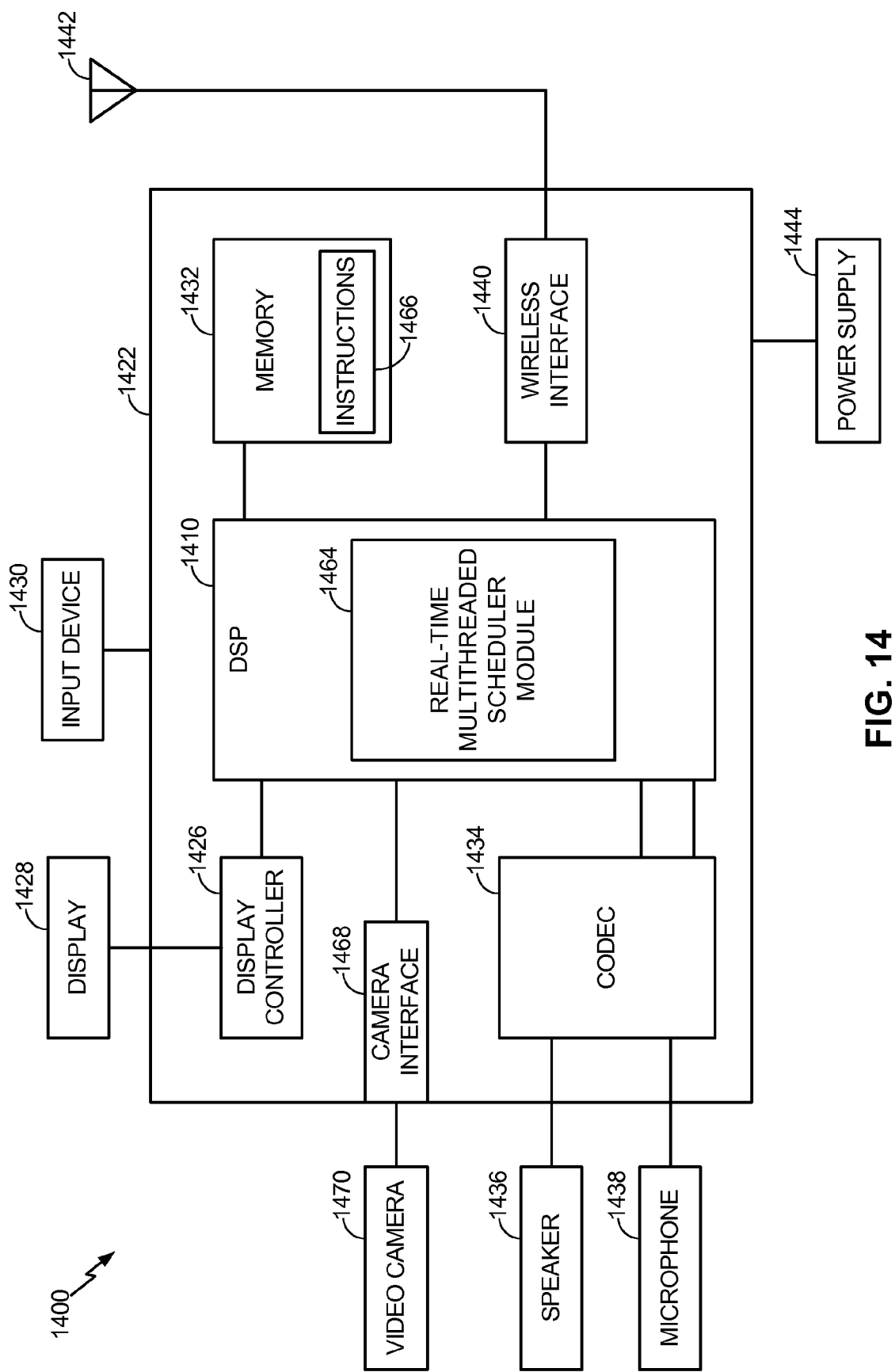
FIG. 14 is a block diagram of a particular embodiment of a portable communication device including a real-time multithreaded scheduler module.

FIG. 14 is a block diagram of particular embodiment of a system 1400 including a real-time multithreaded scheduler module 1464. The system 1400 may be implemented in a portable electronic device and includes a processor 1410, such as a digital signal processor (DSP), coupled to a memory 1432. In an illustrative example, the real-time multithreaded scheduler module 1464 includes any of the systems of FIGS. 1-9, operates in accordance with any of the embodiments of FIGS. 10-13, or any combination thereof. The real-time multithreaded scheduler module 1464 may be in the processor 1410 or may be a separate device or circuitry (not shown). In a particular embodiment, the real-time multithreaded scheduler 106 of FIG. 1 is accessible to a digital signal processor. For example, as shown in FIG. 14, the real-time multithreaded scheduler module 1464 is accessible to the digital signal processor (DSP) 1410.

A camera interface 1468 is coupled to the processor 1410 and also coupled to a camera, such as a video camera 1470. A display controller 1426 is coupled to the processor 1410 and to a display device 1428. A coder/decoder (CODEC) 1434 can also be coupled to the signal processor 1410. A speaker 1436 and a microphone 1438 can be coupled to the CODEC 1434. A wireless interface 1440 can be coupled to the processor 1410 and to a wireless antenna 1442.

The real-time multithreaded scheduler module 1464 is configured to execute computer executable instructions 1466 stored at a computer-readable medium, such as the memory 1432, to cause the real-time multithreaded scheduler module 1464 to direct an interrupt to a lowest priority thread of a plurality of executing threads, where the interrupt indicates at least one task is ready to be executed, where the lowest priority thread of the plurality of executing threads is either executing a lowest priority task or is an idle thread, and where the lowest priority thread of the plurality of executing threads receives the interrupt and initiates an interrupt routine to select a highest priority task from a ready task list. In this manner, the real-time multithreaded scheduler module 1464 can ensure that high priority tasks such as modem tasks are not interrupted by lower priority tasks such as user interface tasks.

In a particular embodiment, the processor 1410, the display controller 1426, the memory 1432, the CODEC 1434, the wireless interface 1440, and the camera interface 1468 are included in a system-in-package or system-on-chip device 1422. In a particular embodiment, an input device 1430 and a power supply 1444 are coupled to the system-on-chip device 1422. Moreover, in a particular embodiment, as illustrated in FIG. 14, the display device 1428, the input device 1430, the speaker 1436, the microphone 1438, the wireless antenna 1442, the video camera 1470, and the power supply 1444 are external to the system-on-chip device 1422. However, each of the display device 1428, the input device 1430, the speaker 1436, the microphone 1438, the wireless antenna 1442, the video camera 1470, and the power supply 1444 can be coupled to a component of the system-on-chip device 1422, such as an interface or a controller.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disk read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   receiving an interrupt at a first thread of a multithreaded processor configured to schedule tasks among threads of a plurality of threads to enable execution of the tasks, the first thread executing a first task that is a lowest priority executing task at the multithreaded processor at a first time;
   initiating an interrupt routine at the first thread;
   identifying a second thread of the multithreaded processor, the second thread different from the first thread and identified based on comparing tasks executing at the plurality of threads, and determining that a second task at the second thread is the lowest priority executing task at the multithreaded processor at a second time occurring after the first time; and
   setting a subsequent interrupt to be directed to the second thread.

2. The method of claim 1, wherein the interrupt indicates at least one task is ready to be executed.

3. The method of claim 1, wherein the multithreaded processor comprises an interleaved multithreaded processor.

4. The method of claim 1, wherein, at the first time, an idle task is assigned to the first thread.

5. The method of claim 1, wherein the first thread receives the interrupt and initiates the interrupt routine to select a highest priority ready task from a ready task list, wherein a first priority of the highest priority ready task from the ready task list is compared to a second priority of the lowest priority executing task from an executing task list, the executing task list configured to store tasks assigned to the plurality of threads of the multithreaded processor, and wherein tasks are swapped only when the first priority is higher than the second priority.

6. The method of claim 5, further comprising:
   after swapping tasks to execute the highest priority ready task from the ready task list at the first thread and to add the first task previously assigned to the first thread to the ready task list, performing a determination of whether any ready tasks of the ready task list have a higher priority than a subsequent lowest priority executing task of a plurality of tasks assigned to the plurality of threads.

7. The method of claim 6, wherein performing the determination of whether any of the ready tasks of the ready task list have the higher priority comprises checking a schedule.

8. The method of claim 6, further comprising:
   determining the subsequent lowest priority executing task of the plurality of tasks assigned to the plurality of threads; and
   using the interrupt routine to set the subsequent interrupt to be directed to the second thread, wherein the second thread is executing the subsequent lowest priority executing task of the plurality of tasks assigned to the plurality of threads.

9. The method of claim 8, further comprising:
   selectively setting the subsequent interrupt based on a result of checking a schedule to determine whether any ready task has a higher priority than the subsequent lowest priority executing task of the plurality of tasks assigned to the plurality of threads.

10. The method of claim 1, further comprising:
    directing, by an interrupt controller of the multithreaded processor, threads of the plurality of threads other than the first thread to be masked from receiving the interrupt, wherein the first thread is not masked from receiving the interrupt.

11. A method comprising:
    receiving an interrupt at a first thread of a set of threads of a multithreaded processor configured to schedule tasks among threads to enable execution of the tasks, the first thread identified based on comparing tasks executing at the set of threads and determining that a first task at the first thread is a lowest priority executing task at the multithreaded processor at a first time, wherein each thread of the set of threads executes a respective task of a set of executing tasks, and wherein each task of the set of executing tasks and each task of a set of ready tasks has a respective priority;
    initiating an interrupt routine at the first thread, wherein, if a first priority of a highest priority ready task of the set of ready tasks is greater than a second priority of the first task, the first task is swapped with the highest priority ready task;
    determining that a second task at a second thread different from the first thread is the lowest priority executing task at the multithreaded processor at a second time occurring after the first time; and
    setting a subsequent interrupt to be directed to the second thread.

12. The method of claim 11, further comprising, after receiving the interrupt at the first thread, iteratively swapping the lowest priority executing task of the set of executing tasks with the highest priority ready task of the set of ready tasks until each task of the set of executing tasks has a priority that is greater than or equal to a priority of every task of the set of ready tasks, wherein each iteration of the iterative swapping includes, after swapping the lowest priority executing task of the set of executing asks with the highest priority ready task of the set of ready tasks:
    determining a subsequent lowest priority executing task of the set of executing tasks; and
    sending a subsequent interrupt to a particular thread executing the subsequent lowest priority executing task of the set of executing tasks to perform a next iteration of the iterative swapping when a subsequent lowest priority of the subsequent lowest priority executing task of the set of executing tasks is less than a subsequent highest priority of a subsequent highest priority ready task of the set of ready tasks.

13. A system comprising a multithreaded processor configured to schedule tasks among threads of a plurality of threads to enable execution of the tasks such that the plurality of threads are executing highest priority tasks, wherein the multithreaded processor is configured to:
identify a particular thread of the plurality of threads, the particular thread identified based on comparing tasks executing at the plurality of threads and determining that a first task at the particular thread is a lowest priority executing task at the multithreaded processor at a first time;
direct an interrupt to the particular thread of the plurality of threads, wherein the particular thread of the plurality of threads receives the interrupt and launches an interrupt routine;
swap the first task with a highest priority ready task;
determine that a second task at a second thread different from the particular thread is the lowest priority executing task at the multithreaded processor at a second time occurring after the first time; and
set a subsequent interrupt to be directed to the second thread.

14. The system of claim 13, wherein the multithreaded processor is configured such that the interrupt does not impact performance of at least one thread executing a highest priority task.

15. The system of claim 13, wherein the multithreaded processor is configured such that the interrupt routine selects the highest priority ready task from a ready task list after receiving the interrupt.

16. The system of claim 13, wherein the multithreaded processor is configured such that, after swapping the first task with the highest priority ready task, a schedule is checked to determine whether any ready task of a ready task list has a higher priority than any executing task assigned to the plurality of threads.

17. The system of claim 13, wherein the multithreaded processor is configured such that tasks assigned to the plurality of threads are updated using a minimum possible number of swaps of tasks of the tasks assigned to the plurality of threads and ready tasks so that each task of the tasks assigned to the plurality of threads has a corresponding priority at least as high as a highest priority of the ready tasks.

18. The system of claim 13, further comprising:
a first data structure including a prioritized executing task list of tasks assigned to the plurality of threads; and
a second data structure including a prioritized ready task list of tasks ready to be assigned to the plurality of threads.

19. The system of claim 18, further comprising an interrupt controller configured to set the subsequent interrupt to be directed to the second thread.

20. The system of claim 18, wherein an interrupt mask is configured to set the interrupt to be directed to the particular thread of the plurality of threads.

21. The system of claim 19, further comprising a scheduler configured to:
move the highest priority ready task from the prioritized ready task list of the second data structure to the prioritized executing task list of the first data structure to associate the highest priority ready task with the particular thread; and
check a schedule to determine whether any ready tasks in the second data structure have a higher priority than the lowest priority executing task in the first data structure.

22. The system of claim 21, wherein the particular thread of the plurality of threads is an idle thread associated with an idle task.

23. A non-transitory computer-readable medium containing computer executable instructions that are executable to cause a computer including a multithreaded processor to:
identify a particular thread of a plurality of threads of the multithreaded processor, wherein the multithreaded processor is configured to schedule tasks among the plurality of threads to enable execution of the tasks, the particular thread identified based on comparing tasks executing at the plurality of threads and determining that a first task at the particular thread is a lowest priority executing task at the multithreaded processor at a first time;
set an interrupt to be directed to the particular thread of the plurality of threads, wherein the interrupt indicates at least one task is ready to be executed, and wherein the particular thread of the plurality of threads receives the interrupt and initiates an interrupt routine that selects a highest priority ready task from a ready task list based on comparing a first priority of the highest priority ready task to a second priority of the first task;
determine that a second task at a second thread different from the particular thread is the lowest priority executing task at the multithreaded processor at a second time occurring after the first time; and
set a subsequent interrupt to be directed to the second thread.

24. The non-transitory computer-readable medium of claim 23, wherein the computer executable instructions are further executable to cause the computer to:
after selecting the highest priority ready task from the ready task list, check a schedule to determine whether any ready task has a higher priority than any executing task; and
selectively issue the subsequent interrupt based on a result of checking the schedule to determine whether any ready task has a higher priority than any executing task.

25. An apparatus comprising:
means for receiving an interrupt at a first thread of a set of threads of a multithreaded processor, wherein the multithreaded processor is configured to schedule tasks among threads of the set of threads to enable execution of the tasks, the first thread identified based on comparing tasks executing at the set of threads and determining that a first task at the first thread is a lowest priority executing task at the multithreaded processor at a first time, wherein each thread of the set of threads executes a respective task of a set of executing tasks, and wherein each task of the set of executing tasks and each task of a set of ready tasks has a respective priority;
means for initiating an interrupt routine at the first thread;
means for iteratively swapping, based on the interrupt, a lowest priority executing task of the set of executing tasks with a highest priority task of the set of ready tasks until each task of the set of executing tasks has a priority that is greater than or equal to a priority of every task of the set of ready tasks;
means for determining that a second task at a second thread different from the first thread is the lowest priority executing task at the multithreaded processor at a second time occurring after the first time; and means for setting a subsequent interrupt to be directed to the second thread.

26. The method of claim 1, wherein the multithreaded processor is included in a processing system, and wherein the processing system includes a plurality of instruction execution units.

27. The method of claim 11, wherein the multithreaded processor comprises an interleaved multithreaded processor.

* * * * *